(12) United States Patent
Chesneau et al.

(10) Patent No.: US 11,775,375 B2
(45) Date of Patent: Oct. 3, 2023

(54) AUTOMATED INCIDENT DETECTION AND ROOT CAUSE ANALYSIS

(71) Applicant: Viavi Solutions, Inc., San Jose, CA (US)

(72) Inventors: Fabrice Chesneau, Haute-Goulaine (FR); Alexandre Dimitriou, Nantes (FR); Faisal M. Y. Samir, Cairo (EG)

(73) Assignee: Viavi Solutions, Inc., Chandler, AZ (US)

( * ) Notice: Subject to any disclaimer, the term of this patent is extended or adjusted under 35 U.S.C. 154(b) by 0 days.

(21) Appl. No.: 17/352,830

(22) Filed: Jun. 21, 2021

(65) Prior Publication Data
US 2022/0334904 A1   Oct. 20, 2022

(30) Foreign Application Priority Data
Apr. 15, 2021  (EP) ..................................... 21305498

(51) Int. Cl.
*G06F 11/07*   (2006.01)
*G06N 20/10*   (2019.01)

(52) U.S. Cl.
CPC ........ *G06F 11/079* (2013.01); *G06F 11/0709* (2013.01); *G06F 11/0751* (2013.01);
(Continued)

(58) Field of Classification Search
CPC .............. G06F 11/0793; G06F 11/079; G06F 11/0709; G06F 11/0751; G06F 11/0772;
(Continued)

(56) References Cited

U.S. PATENT DOCUMENTS 7,437,762 B2 * 10/2008 Dacier .................. G06F 11/079
    709/224
10,135,852 B2   11/2018 Chen et al.
(Continued)

FOREIGN PATENT DOCUMENTS

WO   WO-2019079771 A1 *   4/2019   ......... G05B 23/0283

OTHER PUBLICATIONS

Maheyzah Md Siraj, Mohd Aizaini Maarof, Siti Zaiton Mohd Hashim. Network Intrusion Alert Aggregation Based on PCA and Expectation Maximization Clustering Algorithm. 2009 International Conference on Computer Engineering and Applications IPCSIT vol. 2 (2011) © (2011) IACSIT Press, Singapore. pp. 395-399.
(Continued)

*Primary Examiner* — Yolanda L Wilson
(74) *Attorney, Agent, or Firm* — Farjami & Farjami LLP

(57) ABSTRACT

A system includes a computing platform communicatively coupled to multiple network nodes, the computing platform having processing hardware and a memory storing a software code. The processing hardware is configured to execute the software code to detect multiple anomalous performance indicators originating from one or more of the network nodes, determine, using the anomalous performance indicators in an automated process, the occurrence of an incident, and determine the signature of the incident. The processing hardware is further configured to execute the software code to compare the signature to one or more entries in an incident signature database, perform, when the comparison determines that the signature corresponds to one or more of the entries, a root cause analysis of the incident using the corresponding one or more entries, and generate an incident alert including one or both of a result of the root cause analysis and a description of the incident.

17 Claims, 7 Drawing Sheets

(52) U.S. Cl.
CPC ...... *G06F 11/0772* (2013.01); *G06F 11/0793* (2013.01); *G06N 20/10* (2019.01)

(58) Field of Classification Search
CPC ............ G06F 11/3006; G06F 11/3447; H04L 41/0631; H04L 41/0654; G06N 20/10
See application file for complete search history.

(56) References Cited

U.S. PATENT DOCUMENTS

| | | | |
|---|---|---|---|
| 10,425,294 B2 | 9/2019 | Vasseur et al. | |
| 10,693,711 B1 | 6/2020 | Garg | |
| 11,204,824 B1* | 12/2021 | Tiwari | G06F 11/0793 |
| 2010/0031156 A1* | 2/2010 | Doyle | H04L 41/147 |
| | | | 715/736 |
| 2010/0274893 A1* | 10/2010 | Abdelal | H04L 47/263 |
| | | | 709/224 |
| 2017/0257304 A1* | 9/2017 | Shah | H04L 63/1416 |
| 2018/0321997 A1* | 11/2018 | Palla | G06F 11/0709 |
| 2018/0365294 A1* | 12/2018 | Cho | G06F 16/24542 |
| 2019/0068467 A1* | 2/2019 | Chauhan | H04L 41/147 |
| 2019/0278684 A1* | 9/2019 | Dede | G06F 11/0706 |
| 2019/0356533 A1 | 11/2019 | Vasseur et al. | |
| 2019/0370610 A1* | 12/2019 | Batoukov | G06N 20/20 |
| 2020/0134175 A1* | 4/2020 | Marwah | G06F 9/542 |
| 2020/0267057 A1* | 8/2020 | Garvey | H04L 41/142 |
| 2021/0281492 A1* | 9/2021 | Di Pietro | H04L 41/16 |
| 2021/0406671 A1* | 12/2021 | Gasthaus | G06F 16/2379 |

OTHER PUBLICATIONS

Zheng Chen1*, Xinli Yu2*, Yuan Ling3, Bo Song1, Wei Quan1, Xiaohua Hu1, Erjia Yan1. Correlated Anomaly Detection from Large Streaming Data. 1College of Computing & Informatics, Drexel University 2Department of Mathematics, Temple University 3Alexa AI, Amazon Inc. pp. 1-11.

Jet New. Anomaly Detection of Time Series Data: A note on anomaly detection techniques, evaluation and application, on time series data. pp. 1-11.

Jun Lu, Robnet T. Kerns, Shyamal D. Peddada, Pierre R. Bushel. Principal component analysis-based filtering improves detection for Affymetrix gene expression arrays. Nucleic Acids Research, 2011, vol. 39, No. 13. Apr. 27, 2011. pp. 1-8.

Experiential Networked Intelligence (ENI); ENI use cases. ETSI GS ENI 001 V2.1.1. Sep. 2019. pp. 1-92.

Extended European Search Report for European Application 22155500.6 dated Aug. 8, 2022.

* cited by examiner

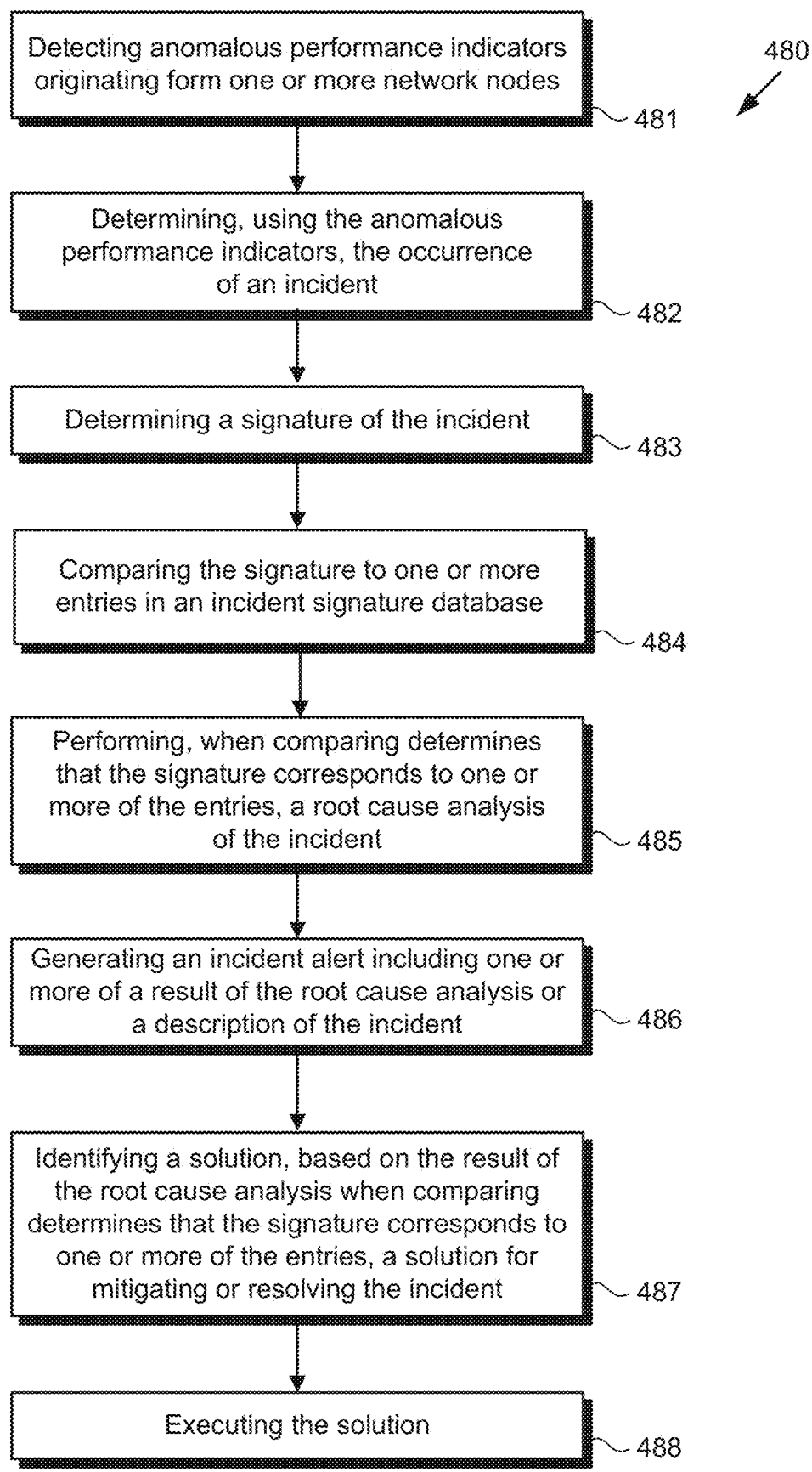

AUTOMATED INCIDENT DETECTION AND ROOT CAUSE ANALYSIS

RELATED APPLICATION(S)

This application claims priority to and the benefit of European Patent Application Serial No. EP21305498.4, filed Apr. 15, 2021, which is hereby incorporated herein by reference in its entirety.

BACKGROUND

A large organization, such as a government entity, big business, or utility, for example may use and rely on a communication network having thousands, hundreds of thousands, or millions of technology nodes. Each of those nodes may correspond to a technology device, such as a switch or router, for example, or to a software application used across the network. Moreover, it is estimated that there are presently billions of nominally independent connected devices that are capable of participating in the Internet of things (IoT). In such use environments, monitoring the performance of each node or connected device can be important for effective network management, as well as problem identification and prevention.

Conventional solutions for monitoring network performance and responding to problem alerts tend to rely on the painstaking examination of many metrics by hand, or using rudimentary techniques such as manual thresholding, and comparing different metrics concurrently to establish a common problem cause. In extreme cases, there may be millions of problem alerts requiring examination, which is not only costly because of its intense reliance on expert human involvement, but may also increase the likelihood of human error due to the sheer volume of work to be performed. Consequently, there is a need in the art for an automated solution for performing network monitoring and problem analysis.

BRIEF DESCRIPTION OF THE DRAWINGS

FIG. 4 shows a flowchart presenting an exemplary method for performing automated incident detection and root cause analysis, according to one implementation.

DETAILED DESCRIPTION

Figure 1:
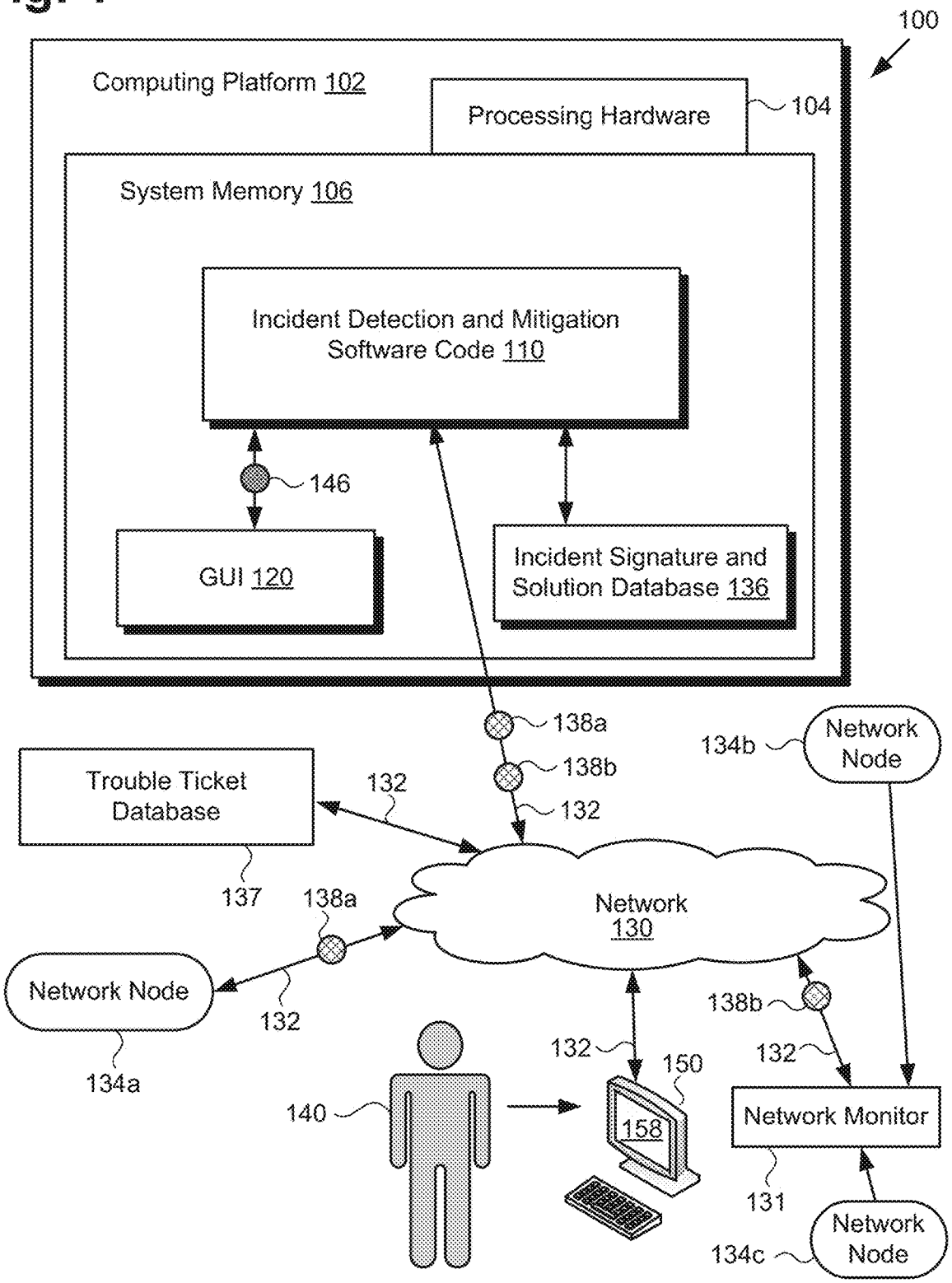
FIG. 1 shows an exemplary system for performing automated incident detection and root cause analysis, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing automated incident detection and root cause analysis that address and overcome the drawbacks and deficiencies in the conventional art. The incident detection and root cause analysis systems and methods disclosed by the present application may be utilized with complex networks. Examples of the types of networks in which the present incident detection and root cause analysis solution can be advantageously implemented include fifth generation of broadband cellular technology (5G), as well as 4G communication networks and legacy 2G and 3G networks, sensor networks in Internet of things (IoT), smart grids, cloud microservices, information technology IT networks, industrial systems such as supervisory control and data acquisition (SCADA) systems, and financial networks providing stock quotes and forecasting, to name a few.

As described in greater detail below, implementations of the present incident detection and root cause analysis solution may be used to automatically determine when an incident occurs within a monitored system from a large number of available performance indicator metrics in the form of time series, for example, or other data types, in order to determine a signature of the incident based on features describing the incident. That incident signature and those descriptive features may advantageously be used to gather information from one or more expert users and/or knowledge bases in order to identify the root cause of the incident. That root cause information, once identified, may be stored by the system for future use in addressing similar incidents. In addition, in some implementations the incident detection and root cause analysis systems and methods disclosed by the present application may be used to identify a solution for mitigating or resolving the incident, and to execute such a solution in an automated process. As a result, the present automated incident detection and root cause analysis systems and methods advantageously enable a network utilizing them to be self-healing networks (SHNs) or self-optimizing networks (SONs).

It is noted that, as used in the present application, the terms "automation," "automated," and "automating" refer to systems and processes that do not require the participation of a human user, such as a system administrator. Although, in some implementations, a human user may review the performance of the automated systems operating according to the automated methods described herein, that human involvement is optional. Thus, in some implementations, the methods described in the present application may be performed under the control of hardware processing components of the disclosed automated systems.

It is further noted that the automated incident detection and root cause analysis systems and methods disclosed in the present application employ sophisticated machine learning predictive models, leading to accurate and dependable results. As defined in the present application, the expression "machine learning predictive model" refers to a mathematical model for making future predictions based on patterns learned from samples of data or "training data." Such a machine learning predictive model may include one or more logistic regression models, Bayesian models, or neural networks (NNs), for example. A "deep neural network," in the context of deep learning, may refer to an NN that utilizes multiple hidden layers between input and output layers, which may allow for learning based on features not explicitly defined in raw data. As used in the present application, a feature identified as an NN refers to a deep neural network.

With respect to the expression "performance indicator," as defined for the purposes of the present application, "performance indicator" refers to any metric useful in characterizing the operational state of a network node. Thus, a performance indicator may be expressed as temperature, pressure, frequency, network traffic, or any other relevant metric. In addition, a performance indicator may include relevant ratios, products, or sums of individual metrics, or any relevant metric, or ratio, product, or sum of metrics as a function of time, or relative to a particular time of day, day of the week, month, season, or year, for example. It is also noted that, for the purposes of the present application, the expressions "performance indicator" and "key performance indicator" (hereinafter "KPI") are equivalent and may be used interchangeably.

It is also noted that, as defined for the purposes of the present application, the term "incident" refers to a real-world event characterized by an associated cluster of anomalous performance indicators, some of which may be triggered by others, some of which may trigger others, and some of which may be detected concurrently but not be directly caused nor be the direct cause of other anomalous KPIs contributing to the incident.

FIG. 1 shows an exemplary system for performing automated incident detection and root cause analysis, according to one implementation. As shown in FIG. 1, system 100 includes computing platform 102 having processing hardware 104 and system memory 106 implemented as a non-transitory storage device. According to the present exemplary implementation, system memory 106 stores incident signature and solution database 136 and incident detection and root cause analysis software code 110 providing graphical user interface (GUI) 120. Moreover, FIG. 1 shows user 140 utilizing user system 150 including display 158 to interact with system 100 via network 130.

As further shown in FIG. 1, system 100 is implemented within a use environment including network 130, network monitor 131, multiple network nodes 134a, 134b, and 134c, and trouble ticket database 137. In addition, FIG. 1 shows performance indicator data 138a received by system 100 from network node 134a, performance indicator data 138b received by system 100 from network monitor 131, and incident alert 146 generated by incident detection and root cause analysis software code 110 and displayed to user 140 via GUI 120. Also shown in FIG. 1 are network communication links 132 of network 130 interactively connecting system 100 with network node 134a, network monitor 131, trouble ticket database 137, and user system 150.

It is noted that although FIG. 1 shows three network nodes 134a, 134b, and 134c in the interests of conceptual clarity, more generally, network nodes 134a, 134b, and 134c correspond to a multitude of nodes of network 130 and may number in the millions or billions in use cases in which network nodes 134a, 134b, and 134c are mobile communication devices or sensors, for example. It is further noted that network nodes 134a and 134b take the form of technology devices, such as switches, routers, or any other suitable network hardware components, which may be virtual devices, or to software applications used locally at a single network node, among a subset of the network nodes included in network 130, or across the entirety of network 130.

It is also noted that although FIG. 1 shows single network monitor 131, more generally, network monitor 131 may correspond to multiple network monitors each aggregating performance indicator data from multiple network nodes. For example, as shown in FIG. 1, network monitor 131 may collect performance indicator data from each of network nodes 134b and 134c, and may transmit the aggregated performance indicator data from those network nodes to system 100 as performance indicator data 138b, in the form of time series or other data types. As further shown in FIG. 1, in some implementations, system 100 may receive performance indicator data 138a, which may also take the form of time series or other data types, directly from network node 134a. Thus, in various implementations, system 100 may receive performance indicator data 138a and 138b from one or more network nodes corresponding to network nodes 134a, 134b, and 134c and/or from one or more network monitors corresponding to network monitor 131.

With respect to the representation of system 100 shown in FIG. 1, it is noted that although incident signature and solution database 136 is shown as a single data resource resident on computing platform 102, that representation is also merely in the interests of conceptual clarity. In other implementations, incident signature and solution database 136 may correspond to multiple data resources including databases and knowledge bases, some, or all of which may be remote from and communicatively coupled to system 100, or may be integrated with system 100. It is further noted that incident signature and solution database 136 stores information required by real-time incident detection and root cause analysis, such as metadata related to time series, anomalies, scores, incidents, signatures, and results of previously performed root cause analyses, for example.

It is also noted that although trouble ticket database 137 is shown as a single data resource remote from system 100 and communicatively coupled to system 100 via network 130 and network communication links 132, that representation is also provided merely by way of example. In other implementations, trouble ticket database 137 may correspond to multiple data resources including databases and knowledge bases that may be remote from and communicatively coupled to system 100.

Although incident signature and solution database 136 and incident detection and root cause analysis software code 110 are depicted as being stored in system memory 106, more generally, system memory 106 may take the form of any computer-readable non-transitory storage medium. The expression "computer-readable non-transitory storage medium," as used in the present application, refers to any medium, excluding a carrier wave or other transitory signal that provides instructions to a hardware processor of a computing platform, such as processing hardware 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

Moreover although FIG. 1 depicts incident signature and solution database 136 and incident detection and root cause analysis software code 110 as being co-located in system memory 106, that representation is also merely provided as an aid to conceptual clarity. More generally, system 100 may include one or more computing platforms, such as computer servers for example, which may be co-located, or may form an interactively linked but distributed system, such as a cloud-based system, for instance. As a result, processing hardware 104 and system memory 106 may correspond to distributed processor and memory resources within system 100. Thus, it is to be understood that in some implementations, one or more of incident signature and solution database 136 and the various features of incident detection and root cause analysis software code 110, such as elements of the exemplary processing pipeline architecture shown and described by reference to FIG. 2, or the exemplary software modules shown and described by reference to FIG. 5, may be stored remotely from one another within the distributed memory resources of system 100.

Processing hardware 104 may include multiple hardware processing units, such as one or more central processing units, one or more graphics processing units, and one or more tensor processing units. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as incident detection and root cause analysis software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) processes such as machine learning.

In some implementations, computing platform 102 may correspond to one or more servers, which may be implemented as physical and/or virtual machines, for example, accessible over a packet-switched network such as the Internet, for example. Alternatively, computing platform 102 may correspond to one or more computer servers supporting a private wide area network (WAN), local area network (LAN), or included in another type of limited distribution or private network.

Although user system 150 is shown as a desktop computer in FIG. 1, that representation is provided merely as an example as well. More generally, user system 150 may be any suitable mobile or stationary computing device or system that includes display 158 and implements data processing capabilities sufficient to implement the functionality ascribed to user system 150 herein. For example, in other implementations, user system 150 may take the form of a laptop computer, tablet computer, or smartphone, for example. With respect to display 158 of user system 150, display 158 may be implemented as a liquid crystal display (LCD), a light-emitting diode (LED) display, an organic light-emitting diode (OLED) display, a quantum dot (QD) display, or any other suitable display screen that performs a physical transformation of signals to light.

Figure 2:
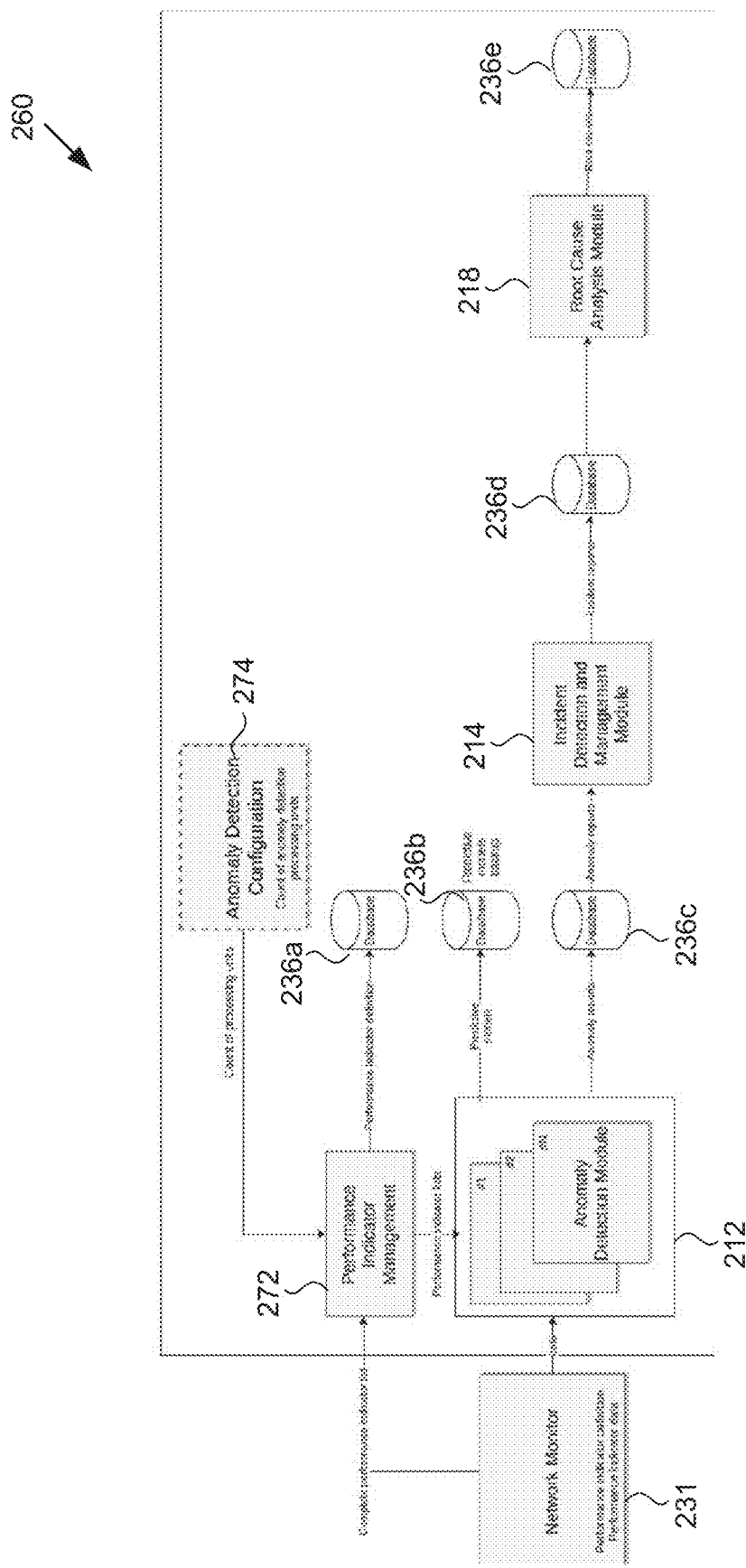
FIG. 2 shows an exemplary processing pipeline architecture suitable for use in the system shown in FIG. 1, according to one implementation.

FIG. 2 shows exemplary processing pipeline architecture 260 suitable for use by system 100 in FIG. 1, according to one implementation. As shown in FIG. 2, processing pipeline architecture 260 includes anomaly detection module 212, incident detection and management module 214, and root cause analysis module 218, as well as databases 236a, 236b, 236c, 236d, and 236e (hereinafter "databases 236a-236e"). Also shown in FIG. 2 are network monitor 231, performance indicator manager 272, and anomaly detection configuration block 274. It is noted that network monitor 231 and databases 236a-236e correspond in general to network monitor 131 and incident signature and solution database 136, in FIG. 1. That is to say, network monitor 231 and databases 236a-236e may share any of the characteristics attributed to respective network monitor 131 and incident signature and solution database 136 by the present disclosure, and vice versa. Thus, like network monitor 131, network monitor 231 may provide system 100 with performance indicator data 138b in the form of time series or other data typed, while databases 236a-236e, like incident signature and solution database 136, stores information required by real-time incident detection and root cause analysis, such as metadata related to time series, anomalies, scores, incidents, signatures, and results of previously performed root cause analyses, for example.

It is further noted that anomaly detection module 212, incident detection and management module 214, and root cause analysis module 218 of processing pipeline architecture may be implemented by respective software modules included in incident detection and root cause analysis software code 110 and described below by reference to FIG. 5. It is also noted that one, some, or all of anomaly detection module 212, incident detection and management module 214, and root cause analysis module 218 may be implemented using one or more machine learning predictive models.

Figure 3A:
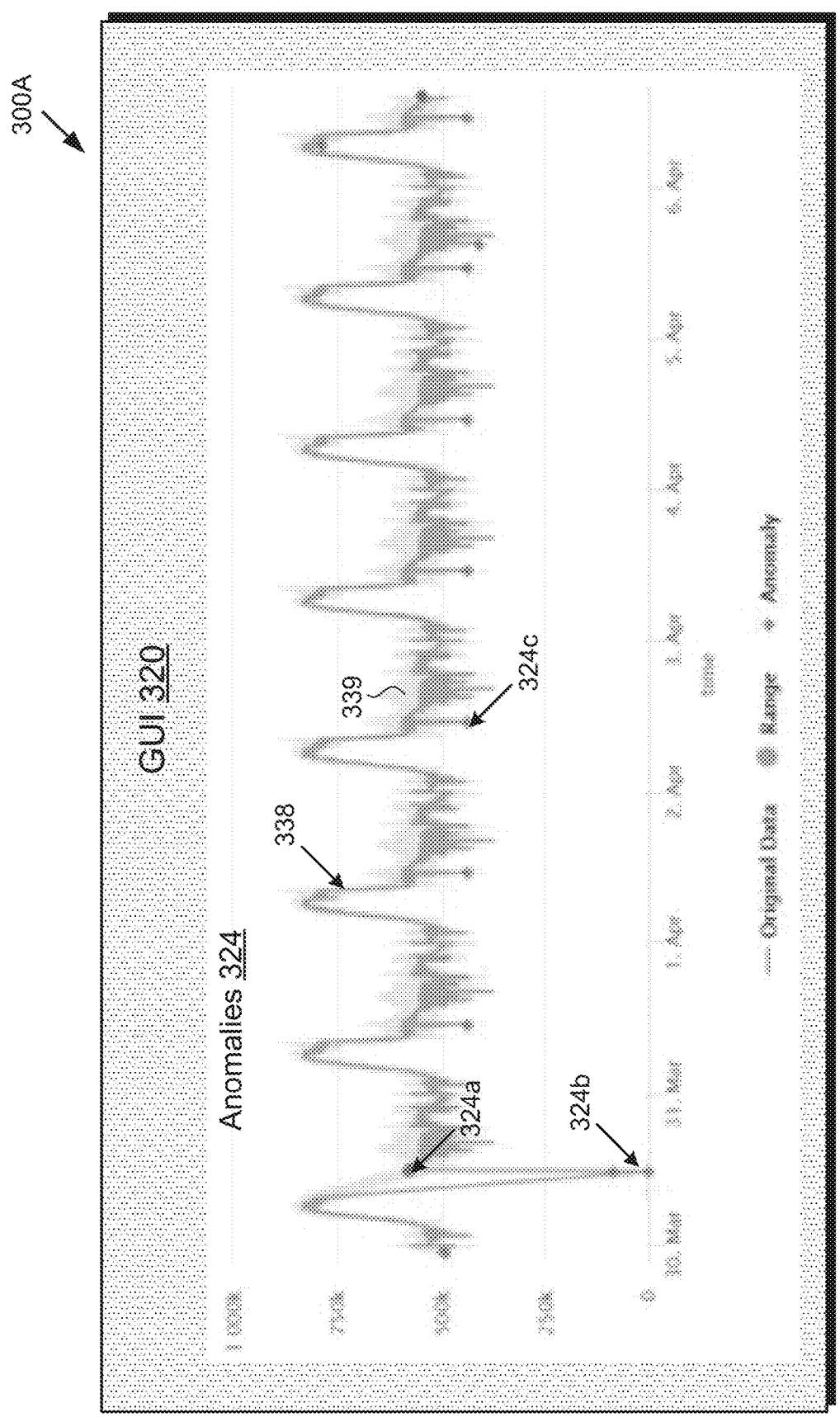
FIG. 3A shows an exemplary representation of an anomalous performance indicator review pane of the GUI provided by the system shown in FIG. 1, according to one implementation.
Figure 3B:
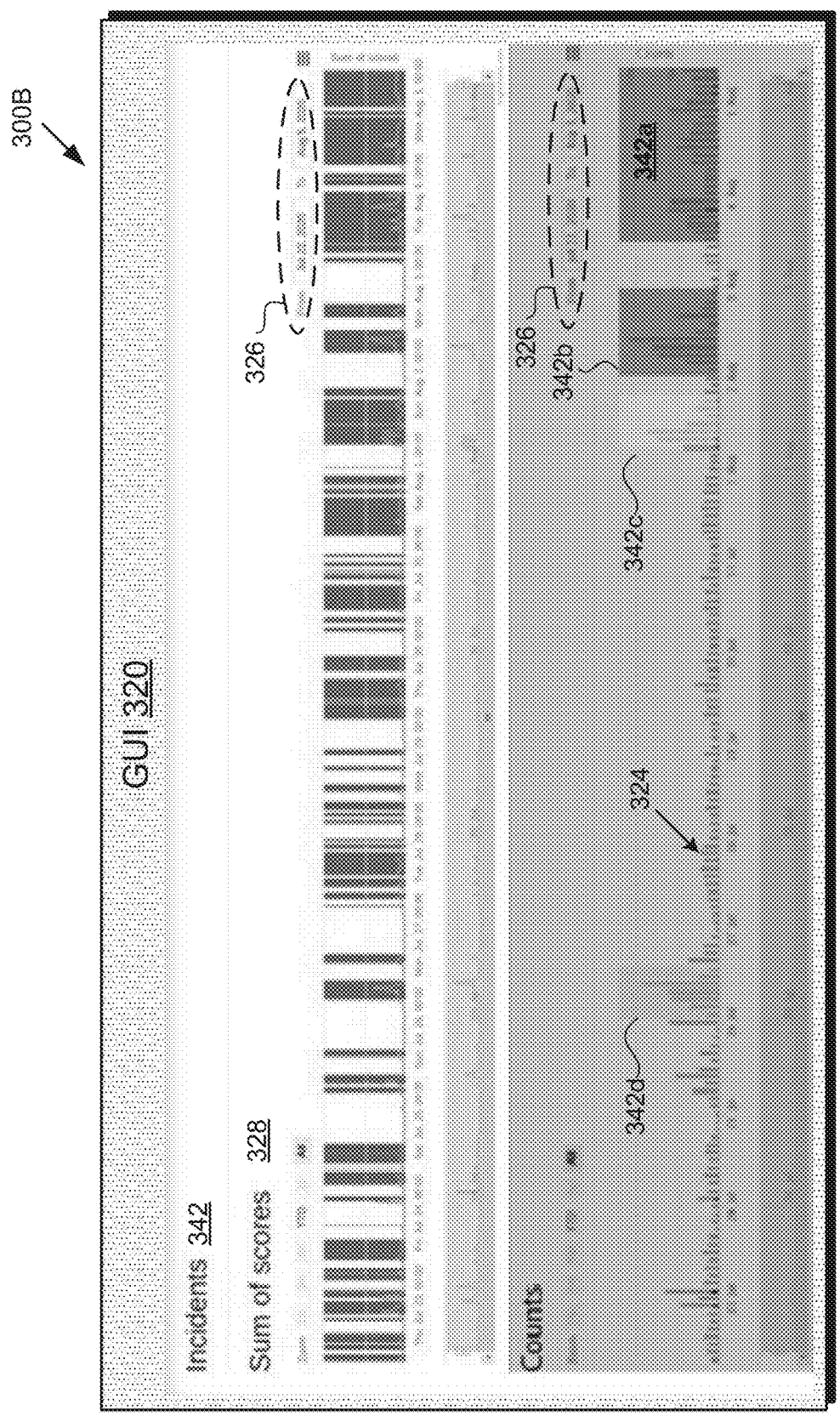
FIG. 3B shows an exemplary representation of an incident identification pane of the GUI provided by the system shown in FIG. 1, according to one implementation.
Figure 3C:
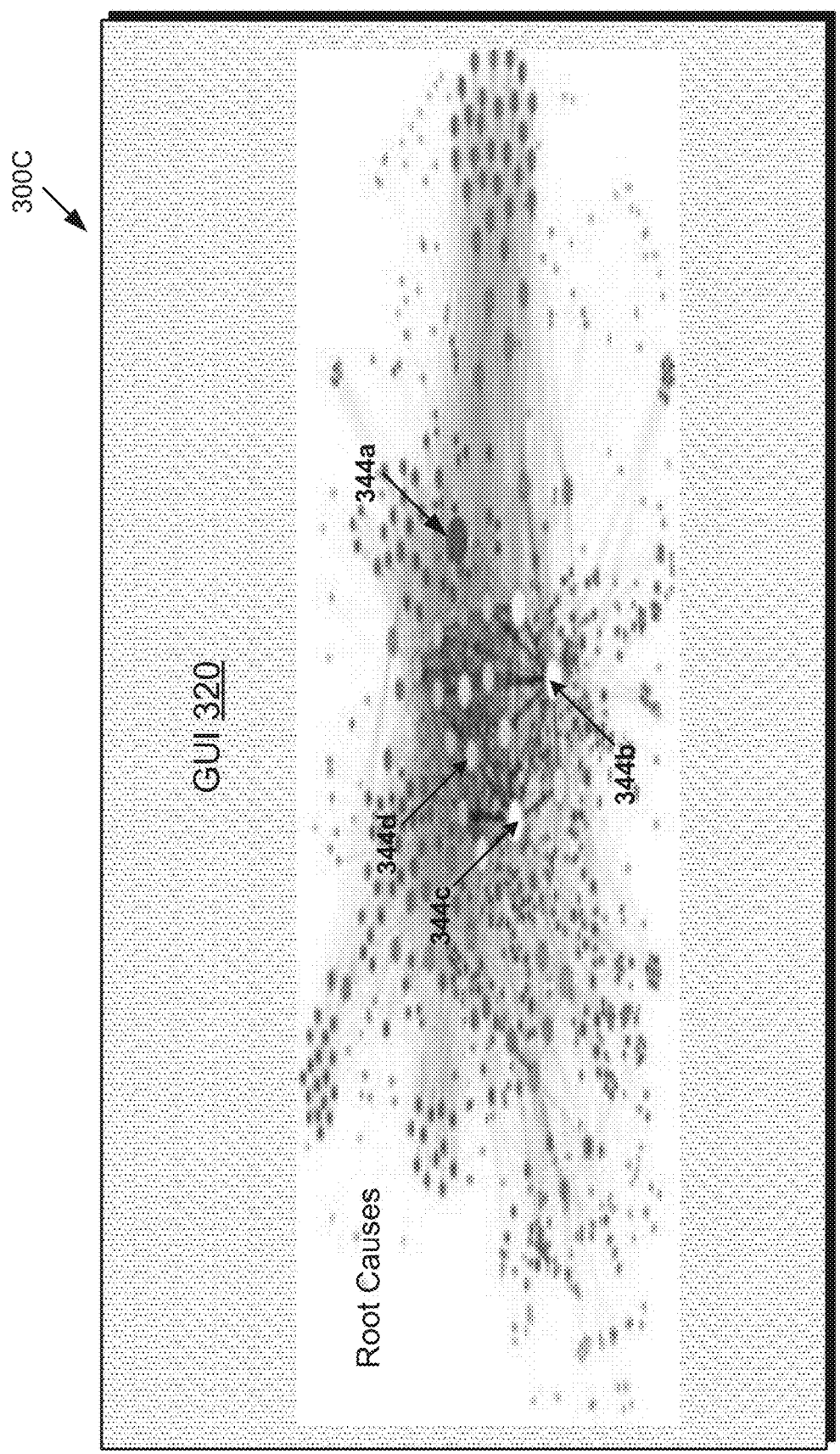
FIG. 3C shows an exemplary representation of a root cause analysis pane of the GUI provided by the system shown in FIG. 1, according to one implementation.

FIGS. 3A, 3B, and 3C (hereinafter "FIGS. 3A-3C"), show exemplary viewing panes of GUI 320, according to one implementation. FIG. 3A shows an exemplary representation of anomalous performance indicator review pane 300A of GUI 320, FIG. 3B shows exemplary incident identification pane 300B of GUI 320, and FIG. 3C shows exemplary root cause analysis pane 300C of GUI 320. It is noted that GUI 320 corresponds in general to GUI 120, in FIG. 1. That is to say, GUI 120 may include any of the characteristics attributed to corresponding GUI 320 by the present disclosure, and vice versa. Thus, GUI 120 may be configured to provide viewing panes corresponding respectively to anomalous performance indicator review pane 300A, incident identification pane 300B, and root cause analysis pane 300C.

Referring to FIG. 3A, anomalous performance indicator review pane 300A of GUI 120/320 shows indicator data 338 including anomalous performance indicators 324a, 324b, and 324c (hereinafter "anomalous performance indicators 324a-324c"), shown in red. It is noted that performance indicator data 338 corresponds to either or both of performance indicator data 138a and 138b, in FIG. 1. As a result, performance indicator data 138a and 138b may share any of the characteristics attributed to performance indicator data 338 by the present disclosure, and vice versa. That is to say, like performance indicator data 338, performance indicator data 138a and 138b may include one or more anomalous performance indicators corresponding to anomalous performance indicators 324a-324c.

Continuing to FIG. 3B, incident identification pane 300B of GUI 120/320 shows time interval 326, e.g., in days, over which anomalous performance indicators are being reported, as well as sum of scores view 328 identifying the relative significance of anomalous performance indicators 324. Anomalous performance indicators 324 correspond to exemplary anomalous performance indicators 324a-324c in FIG. 3A. In sum of scores view 328, each red highlighted region indicates an incident. Furthermore, user 140 can interact with these elements by hovering over lines, bars, or regions, and the counts plot can be filtered to show only anomalies with scores above 80 or at 100, for example, or based on any other selected filtering criterion or criteria. In addition, incident identification pane 300B shows incidences 342a, 342b, 342c, and 342d (hereinafter "incidences 342a-342d") determined based on counts of anomalous performance indicators 324 and their respective scores. As shown in FIG. 3B, incident identification pane 300B uses color to signify the priority assigned to each of incidences 342a-342d, with red indicating highest priority, green indicating lowest priority, and yellow indicating intermediate priority.

Referring to FIG. 3C, root cause analysis pane 300C of GUI 120/320 shows the hierarchy and possible similarities of the root causes 344a, 344b, 344c, and 344d of respective incidences 342a-342d. According to the visualization shown in FIG. 3C, root cause 344a of incident 342a may be a dominant root cause that influences other root causes 344b, 344c, and 344d that in turn give rise to incidences 342b, 342c, and 342d, respectively.

The functionality of incident detection and root cause analysis software code 110 will be further described by reference to FIG. 4 in combination with FIGS. 1, 2, 3A-3C, and 5. FIG. 4 shows flowchart 480 presenting an exemplary method for use by a system, such as system 100, in FIG. 1, for performing automated incident detection and root cause analysis, according to one implementation. With respect to the method outlined in FIG. 4, it is noted that certain details and features have been left out of flowchart 480 in order not to obscure the discussion of the inventive features in the present application.

Figure 5:
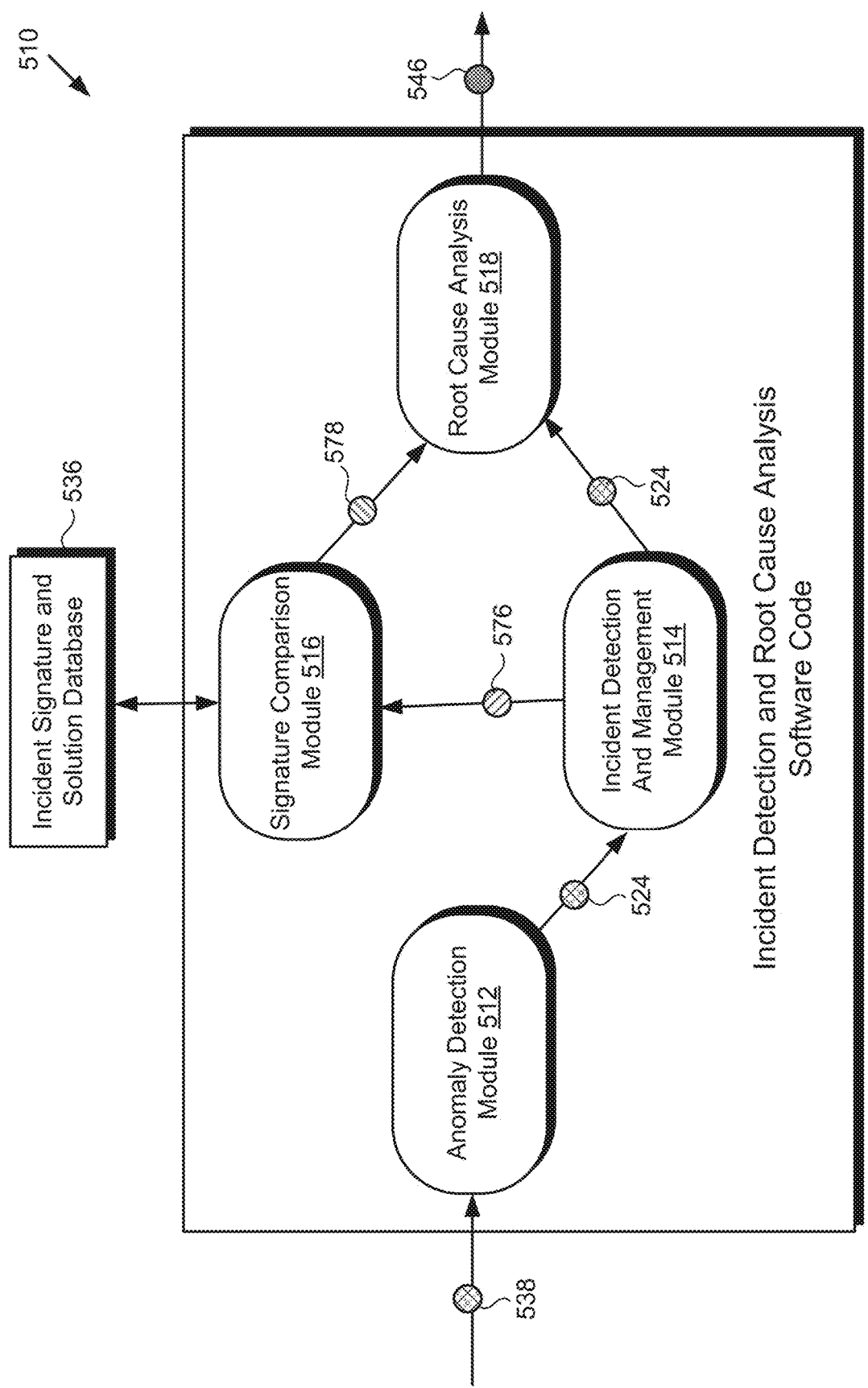
FIG. 5 shows a more detailed depiction of an incident detection and root cause analysis software code suitable for use by the system shown in FIG. 1, according to one implementation.

FIG. 5 shows exemplary incident detection and root cause analysis software code 510 suitable for execution by processing hardware 104 of system 100, according to one implementation. As shown in FIG. 5, incident detection and root cause analysis software code 510 may include anomaly detection module 512, incident detection and management module 514, signature comparison module 516, and root cause analysis module 518. Also shown in FIG. 5 are performance indicator data 538, anomalous performance indicators 524, incident signature 576, incident comparison data 578, and incident alert 546, as well as incident signature and solution database 536 accessible by incident detection and root cause analysis software code 510.

Performance indicator data 538 corresponds in general to performance indicator data 138a and 138b, and performance indicator data 338, in FIGS. 1 and 3A, while anomalous performance indicators 524 correspond in general to anomalous performance indicators 324a-324c/324 in FIGS. 3A and 3B (hereinafter "anomalous performance indicators 324"). In other words, performance indicator data 538 and anomalous performance indicators 524 may share any of the characteristics attributed to respective performance indicator data 138a/138b/338 and anomalous performance indicators 324a-324c/324 by the present disclosure, and vice versa. In addition, incident signature and solution database 536 corresponds in general to incident signature and solution database 136 and databases 236a-236e in FIGS. 1 and 2. That is to say, incident signature and solution database 536 may share any of the characteristics attributed to incident signature and solution database 136 and databases 236a-236e by the present disclosure, and vice versa.

Moreover, incident detection and root cause analysis software code 510 and incident alert 546 correspond respectively in general to incident detection and root cause analysis software code 110 and incident alert 146, in FIG. 1, and those respectively corresponding features may share the characteristics attributed to either corresponding feature by the present disclosure. Thus, like incident detection and root cause analysis software code 510, incident detection and root cause analysis software code 110 may include modules corresponding to anomaly detection module 512, incident detection and management module 514, signature comparison module 516, and root cause analysis module 518.

Referring now to FIG. 4 in combination with FIGS. 1, 2, 3A, and 5, flowchart 480 begins with detecting multiple anomalous performance indicators 324/524 originating from one or more network nodes 134a/134b/134c (action 481). Anomalous performance indicators 324/524 may be detected using one or more machine learning predictive models included in anomaly detection module 212 of processing pipeline architecture 260, implemented by anomaly detection module 512 of incident detection and root cause analysis software code 110/510, executed by processing hardware 104 of computing platform 102.

Anomalous performance indicators 324/524 may be detected by system 100 in a number of ways. In some implementations, detection of anomalous performance indicators 324/524 may be performed as an automated process by system 100. For example, in those implementations, system 100 may automatically poll or probe network node 134a and/or network monitor 131/231 for performance indicator data 138a/138b/338 in order to detect the presence of anomalous performance indicators 324/524. In one such implementation, for example, incident detection and root cause analysis software code 110/510, executed by processing hardware 104, may utilize anomaly detection module 512 to compare performance indicator data 138a/138b/338 with expected values for those performance indicators based on historical operating ranges. Alternatively, or in addition, system 100 may detect anomalous performance indicators 324/524 based on performance indicator data 138a/138b/338 received periodically, or substantially continuously, from network node 134a and/or network monitor 131/231 without that data being affirmatively polled by system 100. In some implementations, anomalous performance indicators 324/524 may be detected in action 481 in an automated process using a machine learning predictive model.

In some implementations, anomalous performance indicators 324/524 may be detected during a specific time interval, and anomalous performance indicators 324/524 may be identified as anomalous based on past behavior of corresponding performance indicators during a previous time interval. For example, such a time interval may extend from a first time of day to a second time of day, and the previous time interval may extend from the same first time of day to the same second time of day on a previous day.

Action 481 may include the analysis of thousands or millions of performance indicators by extracting their data in the form of time series and subsequently identifying abnormal behavior in each of them. This may be accomplished by fitting a data model to capture the normal behavior and labeling any significant deviations as anomalies. The individual anomalies may then be given scores depending on the magnitude of the deviation from the normal model. Such a task may be performed using error modeling and determining the probability of the occurrence of a particular deviation. In some implementations, the normal behavior for each performance indicator may be modeled using a Holt-Winters method, also known as triple exponential smoothing. Essentially, the data for a performance indicator may be divided into three components: level, trend, and seasonal. The Holt-Winters algorithm can be especially effective for modeling time series since time series typically exhibit seasonality; for instance, the same pattern may appear on a daily basis for phone call traffic as people tend to sleep during the night and have more or less a daily routine.

More than one Holt-Winters method exists, namely additive and multiplicative methods. The present automated incident detection and root cause analysis solution may use both methods, but, in some implementations, it may be advantageous or desirable to utilize a variation of the additive method for use cases exhibiting linear seasonality (i.e., the variation in the data does not expand or shrink as time passes).

A machine learning predictive model implemented by anomaly detection module 512 of incident detection and root cause analysis software code 110/510 may first be given an amount of data for training purposes, which allows the calculation of the α, β, and γ parameters that define the shape of the model. These parameters are then used and updated with each successive timestamp to continually update the model and adapt it to new data, effectively 'learning' new normal behaviors of performance indicators autonomously.

The Holt-Winters additive method is given by the following formulas, where t is the current timestamp, s is the length of the seasonal period and α, β, and γ are mathematical constants defining the shape of the model, as noted above:

$$(\text{Level}) L_t = \alpha * (Y_t - S_{t-s}) + (1-\alpha) * (L_{t-1} + b_{t-1}) \quad \text{(Formula 1)}$$

$$(\text{Trend}) b_t = \beta * (L_t - L_{t-1}) + (1-\beta) * b_{t-1} \quad \text{(Formula 2)}$$

$$(\text{Seasonal}) S_t = \gamma (Y_t - L_t) + (1-\gamma) * S_{t-s} \quad \text{(Formula 3)}$$

$$(\text{Forecast for period } m) F_{t+m} = L_t + m * b_t + S_{t+m-s} \quad \text{(Formula 4)}$$

The level component is a measurement of the local mean of the data at a given timeframe. The trend component measures how data increases or decreases linearly over time. The seasonal component indicates a pattern that occurs evenly throughout the data at particular intervals, typically every day or week.

In addition to, or as an alternative to, Holt-Winters, the present incident detection and root cause analysis solution may use one or more other suitable techniques to detect anomalous performance indicators 324/524. Examples of such other suitable techniques include moving average, interquartile range, seasonal and trend using Loess (STL) decomposition, autoregressive integrated moving average (ARIMA), seasonal ARIMA (SARIMA), and a variety of neural networks (NNs). Specific examples of NN architectures suitable for use in detecting anomalous performance indicators include multi-layer perceptrons (MLPs), convolutional NNs (CNNs), long short-term memory (LSTM) recurrent NNs (RNNs), one step predictors, and auto encoders, to name a few.

Once a normal behavior model is formed, it then remains to establish a margin of error for each of the timestamps, for example based on the normal distribution model and a predetermined confidence interval, such as ninety-five percent (95%), for example, or any confidence interval selected by user 140. Once established, the prediction and confidence envelope may be overlaid on performance indicator data 138a/138b/538 for any metric. Data points not falling within that envelope may be considered as anomalous. For instance, a "z-score" may be calculated depending on the desired confidence level, with higher confidence levels leading to larger z-scores. For a 95% confidence interval, for example, a z-score of 1.96 is multiplied by the standard deviation of the prediction to obtain the interval width, which is subsequently added to and subtracted from the prediction to form the envelope as follows:

$$\bar{x} \pm z * \frac{\sigma}{\sqrt{n}} \quad \text{(Formula 5)}$$

where $\bar{x}$ Tc represents the prediction (normal behavior) for the performance indicator, z is the z-score for the required confidence interval, σ is the standard deviation, and n is the number of samples.

An example of the described technique is represented in FIG. 3A, in which anomalous performance indicators 324a-324c, shown in red, may be seen to be situated outside prediction and confidence envelope 339 for performance indicator data 338, shown in blue. The normal data points are shown in the dark blue line plot, with the lighter blue envelope 339 constituting the margin of error and red dots indicating anomalies. GUI 120/320 enables user 140 to hover over the data and view information in a tool-tip, including the point values, error range, and associated anomaly score (anomaly score described below).

It is noted that methods other than the normal distribution model may be used to establish the margin of error helping to define prediction and confidence envelope 339 for performance indicator data 138a/138b/538. Examples of such alternative methods include extreme value theory (EVT) using the peak over threshold (POT) method, as both known in the art.

In some implementations, action 481 may also include application of a scoring model to anomalous performance indicators 324/524 to indicate how much each deviates from normal behavior. In one implementation, the Pareto distribution having a cumulative distribution function (cdf) may be used to calculate an anomaly score. Pareto score modeling may be performed using the following expression:

$$1 - \left(\frac{x_m}{x}\right)^\alpha \quad \text{(Formula 6)}$$

where $x_m$ indicates the threshold of the envelope of the error model, x is the point value of the anomaly, and α is a scaling constant that is typically set to 1.16 to follow the Pareto 80-20 principle, which states that approximately 80% of consequences result from 20% of the causes. For larger deviations from the normal behavior model prediction, the score value calculated would increase. The resulting value is assigned to the anomaly as its score, with all non-anomalous points having a score of 0.

Flowchart 480 further includes determining, using anomalous performance indicators 324/524 in an automated process, the occurrence of an incident, e.g., one of incidences 342a-342d (action 482). The occurrence of an incident may be determined using incident detection and management module 214 of processing pipeline architecture 260, implemented by incident detection and management module 514 of incident detection and root cause analysis software code 110/510, executed by processing hardware 104 of computing platform 102.

Once anomalous performance indicators 324/524 are detected in the first phase of the process, those anomalies, as well as their scores, may be used to determine whether an incident is occurring. In some implementations, it may be necessary to account for performance indicator data 138a/138b/538 with different time sampling periodicities. For example, one of anomalous performance indicators 324/524 may include data points which occur every five minutes, for example, while another may include data points which occur every fifteen minutes, for example. In order to accurately measure the relation between these two exemplary anomalous performance indicators 324/524, one option is to smooth the five-minute data to form a fifteen-minute approximation which can be directly compared to the fifteen-minute data. Another option is to compare only data which have the same sampling period. The present novel and inventive concepts contemplate both options.

The covariances, or the correlations, of each anomalous performance indicator pair over a specific time window may be calculated by examining the anomaly scores of each anomalous performance indicator for each timestamp in the time series. Those calculated values can be placed into a covariance matrix that is symmetric and has values ranging from zero to one, with higher values indicating the possibility that the two anomalous performance indicators in question are related. It is noted that a correlation matrix could also be calculated in place of the covariance matrix, which would offer a form of standardization. This would be especially beneficial when two variables have different scales.

In order to detect the primary causes of the variations displayed by anomalous performance indicators 324/524, a principal component analysis (PCA) may be performed. PCA is the use of eigendecomposition to obtain the eigenvalues and associated eigenvectors of the covariance matrix. The eigenvectors are called principal components, and describe much of the variance of the data, the first component being the component providing the best description of the variance. In other words, a principal component is a linear combination (i.e., a straight line) including anomalous performance indicators 324/524 that attempts to fit as many points as possible (i.e., covariance between anomalous performance indicators 324/524) in a space defined by all of anomalous performance indicators 324/524. Each of anomalous performance indicators 324/524 may then be associated with the principal component that provides the best description for it. This may be done by calculating the cosine of the angle between the vectors composed of every covariance associated to one particular anomalous performance indicator and the eigenvectors. If the cosine has a high value (e.g., above 0.7 or any other predetermined threshold), the anomalous performance indicator variance from normal behavior can be explained by the associated principal component.

Once anomalous performance indicators 324/524 are assigned to principal components, the automated incidence determination process performed in action 482 examines the timestamps of anomalous performance indicators 324/524 and attempts to infer whether the last timestamp is impacted by the determined incident or not. When a new point (timestamp) arrives, the sliding window can be shifted, and the same calculation can be performed again. Thus, as described above, in some implementations, determination of the occurrence of an incident in action 482 may be performed using PCA in an automated process. Alternatively, determination of the occurrence of an incident in action 482 may be performed using a machine learning predictive model, such as one including a support vector machine (SVM), for example. As yet other alternatives, action 482 may be performed using any of a variety of suitable data science techniques including density-based spatial clustering of applications with noise (DBSCAN), K-means clustering, hierarchical clustering, isolation forest, and random forest techniques, to name a few. Regardless of the specific techniques used to determine the occurrence of an incident in action 482, it is noted that the occurrence of the incident is determined in real-time during the occurrence of the incident.

It is noted that when an incident is detected, it is typically kept open and its signature is stored in memory for reference. At the processing of each new timestamp, all newly detected incidents having an impact on the current timestamp can be compared to every opened incident stored in memory. If it is determined through comparison that the signature of a new incident signature matches or substantially matches that of an open incident, the new incident may be merged with the old incident and may remain open. If an open incident is not matched with any new incidents, it may be closed and its signature may be removed from memory.

Flowchart 480 further includes determining signature 576 of the incident (action 483). Signature 576 of the incident determined to be occurring in action 482 may be determined using incident detection and management module 214 of processing pipeline architecture 260, implemented by incident detection and management module 514 of incident detection and root cause analysis software code 110/510, executed by processing hardware 104 of computing platform 102.

Incident signature 576 may be determined based on one or more of the types and number of metrics included among anomalous performance indicators 324/524, their respective scores, a progressively cumulative score characterizing the incident as it evolves, and a time series over which anomalous performance indicators 324/524 are detected, for example. In addition, or alternatively, where PCA is employed to determine the occurrence of the incident, incident signature 576 may be determined based on the eigenvectors of the covariance matrix.

Flowchart 480 further includes comparing incident signature 576 to at least one of multiple entries in incident signature and solution database 136/236a-236e/536 (action 484). Incident signature 576 may be compared to the entries in incident signature and solution database 136/236a-236e/536 by incident detection and root cause analysis software code 110/510, executed by processing hardware 104 of computing platform 102, and using signature comparison module 516.

Action 484 may enable identification of the incident determined to be occurring in action 482 based on the occurrence of the same or similar incidences in the past. Respective signatures for such past incidences, as well as their root causes and previous solutions for mitigating or resolving those past incidences be stored together in incident signature and solution database 136/236a-236e/536. Incident signature and solution database 136/236a-236e/536 may be searched in action 484 using incident comparison module 516 to identify one or more stored signatures that substantially match or are most similar to incident signature 576.

Incident signatures can be compared using similarity evaluation between sets of anomalous performance indicators 324/524 related to a particular incident. Possible results of such comparisons can be, for example, incident signatures are considered equal when the similarity between related sets of anomalous performance indicators is strong, one of the incident signatures is a subset of the other signatures, or incident signature 576 differs substantially from the entries stored in incident signature and solution database 136/236a-236e/536.

Flowchart 480 further includes performing, when action 484 determines that incident signature 576 corresponds to one or more of the entries in incident signature and solution database 136/236a-236e/536, a root cause analysis of the incident using the corresponding one or more entries (action 485). Action 485 may be performed using one or more machine learning predictive models included in root cause analysis module 218 of processing pipeline architecture 260, implemented by incident analysis module 518 of incident detection and root cause analysis software code 110/510, executed by processing hardware 104 of computing platform 102. The root cause analysis in action 485 may be performed using incident comparison data 578 obtained from incident signature and solution database 136/236a-236e/536 by signature comparison module 516 in action 484.

Where incident comparison data 578 reveals a match or substantial match between incident signature 576 and an entry in incident signature and solution database 136/236a-236e/536 the root causes behind the matching or nearly matching signatures may be considered to be the same. Alternatively, where incident comparison data 578 reveals that incident signature 576 is a subset of one or more entries in incident signature and solution database 136/236a-236e/536, or vice versa, a hierarchy of signatures may be established in which the subset signature represents a lower tier signature. Thus, using incident signature comparisons, it is then possible to identify whether a root cause has previously been encountered and addressed.

In some implementations, the present incident detection and root cause analysis solution may utilize user-defined root causes as well as previously encountered root causes. For example, user 140 may manually enter a root cause description for an incident through GUI 120/320. Incident detection and root cause analysis software code 110/510 may be configured to generate a predicted incident signature corresponding to the user-defined root cause, and the predicted incident signature and user defined root cause could be stored together as an entry in incident signature and solution database 136/236a-236e/536.

In instances in which incident comparison data 578 reveals a match or a substantial match between incident signature 576 and the entries in incident signature and solution database 136/236a-236e/536, that matching or substantially matching entry may be used as a basis for determining the root cause of the incident having signature 576. Moreover, even in instances in which incident comparison data 578 reveals no match or substantial match between incident signature 576 and the entries in incident signature and solution database 136/236a-236e/536, a similar entry may nevertheless be used as a basis for determining the root cause of the incident having signature 576. For example, the root cause of the incident having the similar incident signature may be selected, and may have its variables adjusted to determine whether one or more adjustments are predicted to result in a closer match to incident signature 576.

In some implementations, flowchart 480 can conclude with generating incident alert 146/546 including one or both of a result of the root cause analysis performed in action 485 and a description of the incident if incident comparison data 478 reveals that signature 576 is unrelated to any entry in incident signature and solution database 136/236a-236e/536 (action 486). For example, incident alert 146/546 may include a description of the incident that uses the first timestamp of the time series of the incident as the incident ID. Incident alert 146/546 may also list each anomalous performance indicator 324/524 included in the incident, as well as their respective scores, and the signature of the incident determined in action 483.

The generation of incident alert 146/546 may be performed using root cause analysis module 218 of processing pipeline architecture 260, implemented by incident analysis module 518 of incident detection and root cause analysis software code 110/510, executed by processing hardware 104 of computing platform 102. In some implementations, incident alert 146/546 may displayed to system user 140 via GUI 120/320. Moreover, in some implementations, incident alert 146/546 may include the viewing panes shown by FIGS. 3A-3C.

In some implementations, flowchart 480 may further include identifying a solution, based on the result of the root cause analysis performed in action 485, for one or more of mitigating or a resolving the incident determined in action 482 (action 487). Action 487 may be performed by incident detection and root cause analysis software code 110/510, executed by processing hardware 104 of computing platform 102, and using incident analysis module 518.

As noted above, the entries stored in incident signature and solution database 136/236a-236e/536 may identify solutions for mitigating and/or resolving past incidences, as well as their respective signatures and root causes. Thus, in some use cases, incident comparison data 578 may include a mitigation or resolution strategy for the incident having signature 576. Alternatively, or in addition, incident detection and root cause analysis software code 110/510 may utilize one or more machine learning predictive models to infer a mitigation or resolution strategy for the incident determined to be occurring in action 482.

In some implementations, the present incident detection and root cause analysis systems and methods may utilize user-defined mitigation or resolution techniques as well as inferred or historical solutions. For example, user 140 may manually enter a mitigation or resolution strategy for an incident through GUI 120/320. That user defined mitigation or resolution strategy could then be stored with incident signature 576 as an entry in incident signature and solution database 136/236a-236e/536.

In some implementations, flowchart 480 may further include executing the solution identified in action 487 to perform the at least one of the mitigation or the resolution of the incident determined to be occurring in action 482 (action 488). Action 488 may be performed by incident detection and root cause analysis software code 110/510, executed by processing hardware 104 of computing platform 102. Action 488 may include outputting instructions to one or more of network nodes 134a and 134b to change its operating parameters, such as by increasing or reducing temperature or pressure, increasing or reducing operating frequency, or diverting network traffic to another network node, to name a few examples.

With respect to the actions outlined by flowchart 480, it is emphasized that actions 481, 482, 483, 484, 485, and 486 (hereinafter "actions 481-486"), or actions 481-486 and 487, or actions 481-486, 487, and 488, may be performed in an automated process from which human involvement may be omitted.

Thus, the present application discloses automated systems and methods for performing automated incident detection and root cause analysis that address and overcome the drawbacks and deficiencies in the conventional art. As discussed above, the incident detection and root cause analysis systems and methods disclosed by the present application may be utilized with complex networks, and may be used to automatically determine when an incident occurs within a monitored system from a large number of available performance indicators in the form of time series, to determine a signature of the incident based on features describing the incident, and to gather information from one or more of expert users and knowledge bases in order to identify the root cause of the incident. In addition, and as also discussed above, in some implementations the incident detection and root cause analysis systems and methods disclosed by the present application may be used to identify a solution for mitigating or resolving the incident, and to execute such a solution in an automated process. As a result, the present automated incident detection and root cause analysis systems and methods advantageously enable a network utilizing them to be self-healing or self-optimizing.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
    a computing platform communicatively coupled to a plurality of network nodes;
    the computing platform including a hardware processor and a system memory storing a software code;
    the hardware processor configured to execute the software code to:
        detect a plurality of anomalous performance indicators in a first automated process using a first machine learning predictive model, the plurality of anomalous performance indicators originating from one or more of the plurality of network nodes;
        determine, using the plurality of anomalous performance indicators in a second automated process using a second machine learning predictive model, an occurrence of an incident;
        determine a signature of the incident;
        compare the signature to at least one of a plurality of entries in an incident signature database;
        perform, when comparing determines that the signature corresponds to one or more of the plurality of entries, a root cause analysis of the incident using the corresponding one or more of the plurality of entries; and
        generate an incident alert including at least one of a result of the root cause analysis or a description of the incident.

2. The system of claim 1, wherein the hardware processor is further configured to execute the software code to:
    identify a solution, based on the result of the root cause analysis when comparing determines that the signature corresponds to one or more of the plurality of entries, for performing at least one of a mitigation or a resolution of the incident; and
    execute the solution to perform the at least one of the mitigation or the resolution.

3. The system of claim 1, wherein the plurality of anomalous performance indicators are detected during a time interval, and wherein the plurality of anomalous performance indicators are identified as anomalous based on a comparison of respectively corresponding performance indicators during a previous time interval, and wherein the comparison is performed based on a Holt-Winters method.

4. The system of claim 1, wherein the occurrence of the incident is determined using a principal component analysis.

5. The system of claim 1, wherein the occurrence of the incident is determined in real-time during the occurrence of the incident.

6. The system of claim 1, wherein the first machine learning predictive model comprises a support vector machine.

7. A method for use by a system including a computing platform communicatively coupled to a plurality of network nodes, the computing platform having a hardware processor and a system memory storing a software code, the method comprising:
    detecting, by the software code executed by the hardware processor, a plurality of anomalous performance indicators in a first automated process using a first machine learning predictive model, the plurality of anomalous performance indicators originating from one or more of the plurality of network nodes;
    determining, by the software code executed by the hardware processor and using the plurality of anomalous performance indicators in a second automated process using a second machine learning predictive model, an occurrence of an incident;
    determining, by the software code executed by the hardware processor, a signature of the incident;
    comparing, by the software code executed by the hardware processor, the signature to at least one of a plurality of entries in an incident signature database;
    performing, by the software code executed by the hardware processor when comparing determines that the signature corresponds to one or more of the plurality of entries, a root cause analysis of the incident using the corresponding one or more of the plurality of entries; and
    generating, by the software code executed by the hardware processor, an incident alert including at least one of a result of the root cause analysis or a description of the incident.

8. The method of claim 7, further comprising:
    identifying a solution, by the software code executed by the hardware processor and based on the result of the root cause analysis when comparing determines that the signature corresponds to one or more of the plurality of entries, for performing at least one of a mitigation or a resolution of the incident; and
    executing the solution, by the software code executed by the hardware processor, to perform the at least one of the mitigation or the resolution.

9. The method of claim 7, wherein the plurality of anomalous performance indicators are detected during a time interval, and wherein the plurality of anomalous performance indicators are identified as anomalous based on a comparison of respectively corresponding performance indicators during a previous time interval, and wherein the comparison is performed based on a Holt-Winters method.

10. The method of claim 7, wherein the occurrence of the incident is determined using a principal component analysis.

11. The method of claim 7, wherein the occurrence of the incident is determined in real-time during the occurrence of the incident.

12. The method of claim 7, wherein the first machine learning predictive model comprises a support vector machine.

13. A system comprising:
a computing platform communicatively coupled to a plurality of network nodes;
the computing platform including a hardware processor and a system memory storing a software code;
the hardware processor configured to execute the software code to:
  detect, using a first trained machine learning predictive model, a plurality of anomalous performance indicators originating from one or more of the plurality of network nodes, the first trained machine learning predictive model configured to learn new normal behaviors of the plurality of anomalous performance indicators autonomously;
  determine, using the plurality of anomalous performance indicators in an automated process using a second machine learning predictive model, an occurrence of an incident;
  determine a signature of the incident;
  compare the signature to at least one of a plurality of entries in an incident signature database;
  perform, when comparing determines that the signature corresponds to one or more of the plurality of entries, a root cause analysis of the incident using the corresponding one or more of the plurality of entries;
  identify a solution, based on the result of the root cause analysis when comparing determines that the signature corresponds to one or more of the plurality of entries, for performing at least one of a mitigation or a resolution of the incident; and
  execute the solution to perform the at least one of the mitigation or the resolution.

14. The system of claim 13, wherein the second machine learning predictive model comprises a support vector machine.

15. The system of claim 13, wherein the plurality of anomalous performance indicators are detected during a time interval, and wherein the plurality of anomalous performance indicators are identified as anomalous based on a comparison of respectively corresponding performance indicators during a previous time interval, and wherein the comparison is performed based on a Holt-Winters method.

16. The system of claim 13, wherein the occurrence of the incident is determined using a principal component analysis.

17. The system of claim 13, wherein the occurrence of the incident is determined in real-time during the occurrence of the incident.

* * * * *